LINEARITY CORRECTION CIRCUIT

Filed April 3, 1964 2 Sheets-Sheet 1

INVENTOR.
BURNARD EUGENE NICHOLSON
BY
W. H. Sprouagle
Attorney

March 21, 1967 B. E. NICHOLSON 3,310,705

LINEARITY CORRECTION CIRCUIT

Filed April 3, 1964 2 Sheets-Sheet 2

INVENTOR.
BURNARD EUGENE NICHOLSON
BY
W. H. Sprouagle
Attorney

United States Patent Office 3,310,705
Patented Mar. 21, 1967

3,310,705

LINEARITY CORRECTION CIRCUIT

Burnard E. Nicholson, Haddonfield, N.J., assignor to Radio Corporation of America, a corporation of Delaware Filed Apr. 3, 1964, Ser. No. 357,027
4 Claims. (Cl. 315—27)

This invention relates to circuit arrangements for providing electromagnetic deflection of an electron beam in a cathode ray device. The invention is related more particularly to linearity correction circuits for improving the trace linearity of a deflected beam.

A circuit arrangement for providing electromagnetic scanning of an electron beam in a cathode ray device includes a deflection winding which is positioned about a portion of the device and is adapted to deflect the electron beam when a current flows in the winding. Circuit means are provided for causing a current of generally sawtooth waveform to flow in the winding.

A requirement for linear scanning of the electron is a cathode ray device of electrical equipment, such as a television apparatus, is widely recognized. The requirement is especially pronounced in television broadcast apparatus where the scanning linearity of an electron beam in an image pick-up device largely determines the degree of scanning linearity which can be achieved at television receiving apparatus. Various factors including the resistance of the deflection winding and manufacturing deviations between windings can render a trace portion of the electron beam scan nonlinear. It is therefore customary to provide circuit means for correcting nonlinearities in electron beam scanning. One form of correction circuit applies a correction signal to the deflection winding. This signal, in addition to a signal provided by the deflection circuit scanning means, forms a composite signal which compensates for the scanning nonlinearities and provides a linear deflection of the electron beam. Prior circuit arrangement for providing this linearity compensating signal is relatively complex and relatively inefficient in the utilization of electrical energy.

Accordingly, it is an object of this invention to provide an improved circuit arrangement for applying a linearity correcting signal to an electron beam deflection winding.

Another object of this invention is to provide a circuit arrangement, for applying a linearity correcting signal to a deflection winding, which is relatively efficient in the utilization of electrical energy.

A further object of the invention is to provide a relatively simple and uncomplex circuit arrangement for applying a linearity correction signal to an electron beam deflection winding.

In accordance with the present invention, an electron beam deflection circuit arrangement includes a deflection winding, circuit means for causing a deflection current to flow in the winding, circuit means including an electrical storage element arranged for generating and applying a linearity correction signal to the deflection winding during a trace interval of beam deflection, and substantially nondissipative circuit means for removing and restoring energy to the element during a retrace interval of the deflection cycle. By this arrangement, energy from the storage element is recirculated at the termination of a trace interval and a relatively efficient nondissipative linearity correction circuit arrangement is provided.

These and other features of the invention will become apparent with reference to the following specifications and drawings in which.

Figure 1:
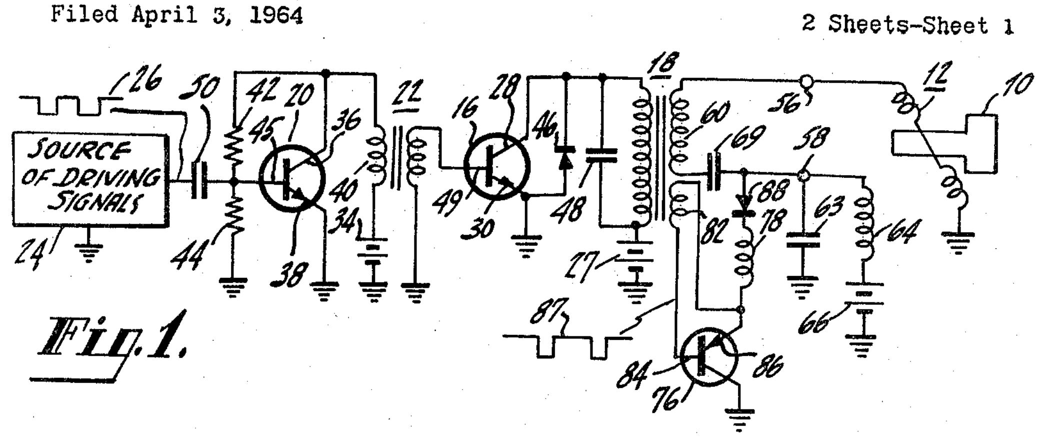
FIGURE 1 is a schematic diagram of a deflection circuit arrangement employing an embodiment of the present invention.

Referring now to FIGURE 1, a circuit arrangement is illustrated for providing electromagnetic deflection of an electron beam in a cathode ray device 10. As an illustrative example, the device 10 may comprise an image orthicon or other form of image pick-up device utilized in a television broadcast apparatus. A deflection winding, indicated generally as 12, is positioned with reference to the device 10 for establishing an electromagnetic, electron-beam-deflecting field when a current flows in the winding. Means for generating a current in the winding 12 comprise an output amplifier stage having a transistor amplifying device 16 and an output transformer indicated generally as 18; a driver stage having a transistor amplifier device 20 and a driver stage output transformer indicated generally as 22; and a source 24 of driving signal 26. The source 24 may comprise a synchronizing signal generator in a television broadcast apparatus. Direct current operating potential for the output transistor 16 is provided by a source 27 and is applied between collector and emitter electrodes 28 and 30 respectively through a primary winding 32 of the output transformer 18 and by a common ground connection. Similarly, direct current operating potential for the driver transistor 20 is provided by a source 34 and is applied between collector and emitter electrodes 36 and 38 respectively through a primary winding 40 of the driver transformer 22 and by a common ground connection. Resistors 42 and 44 are provided and arranged for establishing a bias at a base electrode 45 of the driver transistor 20. A damper diode 46 is connected between the collector and emitter electrode of the output transistor and a capacitor 48 is connected across the primary winding of transformer 18 for tuning the transformer and its reflected impedance to a frequency greater than the frequency of the signal 26. The resistor, which is shown to be variable, operates as a width control for the deflection circuit. The driving signal 26 is coupled by a capacitor 50 from source 24 to the base electrode 45 of the driver transistor and the amplified driving signal is coupled from the collector 36 of the driver transistor to the base electrode 49 of the output transistor via the transformer 22. The deflection voltage $E_S$ (FIGURE 2), is thereby established between output terminals 56 and 58 of a secondary winding 60 of the output transformer 18.

The voltage $E_S$ causes a current of generally sawtooth waveform to flow in the deflection winding 12. Because of resistance in the deflection winding 12, the transformer 18 and the saturation resistance of the transistor 16, a trace segment 62 (FIGURE 2), of the voltage $E_S$ occurring during a trace interval $T_T$ of the deflection cycle $T_H$, will have a slope as indicated. A corresponding trace segment of the sawtooth deflection current waveform (not illustrated) will deviate from linearity during the trace interval $T_T$. Other factors such as manufacturing variations in the deflection winding 12, the transformer 18 and the transistor 16 can cause nonlinearities in the deflection of the electron beam during the interval $T_T$.

Figure 2:
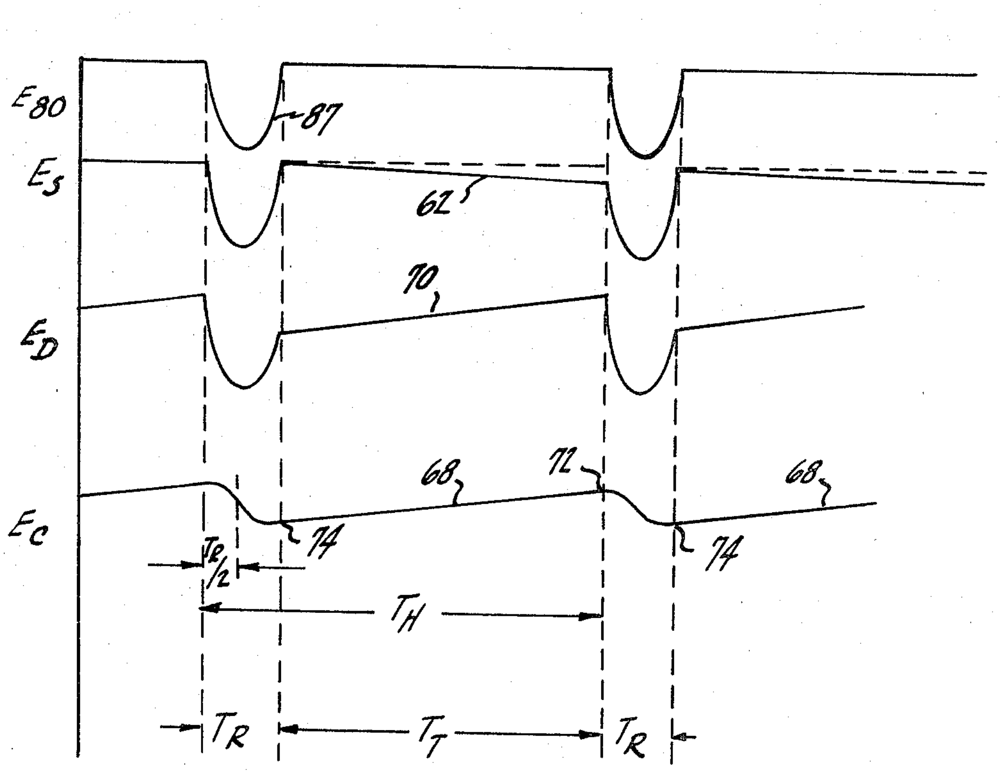
FIGURE 2 is a diagram of the waveforms of various electrical signals occurring in the circuit arrangement of FIGURE 1.

A linearity correction circuit arrangement is provided for applying a signal, comprising a sawtooth voltage, to the secondary winding 60 for correcting nonlinearities occurring in electron beam deflection. The correction circuit includes a capacitive storage element 63, an inductance 64, and a soure of potential 66. Current for charging the capacitor 63 flows from the source 66 through the inductance 64 to the capacitor 63. The inductance 64 is relatively large and a substantially linear increase in voltage occurs across the capacitor 63 during the interval $T_T$. A waveform of voltage, $E_C$, which is generated across the capacitor 63 is illustrated in FIGURE 2. The voltage $E_C$ includes a ramp segment 68. The voltage $E_C$ is applied in series with the voltage $E_S$ by a direct current blocking capacitor 69 and a composite deflection voltage, $E_D$, which is the sum of the voltages $E_C$ and $E_S$, exists between terminal 56 and ground. The voltage, $E_D$, which includes a ramp segment 70 is applied to the deflection winding 12 for causing a substantially linear electron beam trace during the interval $T_T$.

At the termination of the interval $T_T$, the capacitor 63 has an energy level as is indicated by reference numeral 72 on the voltage waveform of FIGURE 2. It is desirable that the capacitor 63 discharge this stored energy and return to an initial energy level 74 for generating a ramp segment 68 of a successive deflection cycle. Circuit means comprising a transistor 76, and an inductance 78 are provided for reestablishing the energy level of the capacitor 63 at the level 74 in a substantially nondissipative manner. The transistor 76 operates as a switch. As the drive signal 26 initiates a retrace interval, $T_R$, of the deflection cycle $T_H$, current in the winding 12 rapidly decrease and a signal $E_{80}$ is generated across a winding 82 of the transformer 18. The winding 82 couples the signal $E_{80}$ between base and emitter electrodes, 84 and 86 respectively, and a pulse component 87 and $E_{80}$ drives the transistor 76 into collector current conduction during the retrace interval, $T_R$, of the deflection cycle. Capacitor 63 begins to discharge through the inductance 78 and the collector-emitter circuit of the transistor 76. The inductor 78 forms with the capacitor 63 a resonant circuit having a period of natural resonance, $T_{RO}$, which is substantially equal to twice the retrace interval, $T_R$. Since the transistor is conducting during the interval, $T_R$, this resonant circuit oscillates for one half cycle. During the oscillation, electrical energy in the electrostatic field of the capacitor transfers to the inductance 78 and establishes an electromagnetic field of peak amplitude at a time, $T_{R/2}$ (FIGURE 2). This energy is successively returned to the capacitor 63, but with opposite polarity, during a latter half of the retrace interval $T_R$. The capacitor 63 is thus returned to the desired energy level without substantial dissipation of electrical energy.

A diode 88 is provided in order to inhibit further oscillation and any possible return of energy from the capacitor 63 to the inductor 78 when circuit tolerances and variations establish a period of natural resonance which is less than twice the retrace interval.

Figure 3:
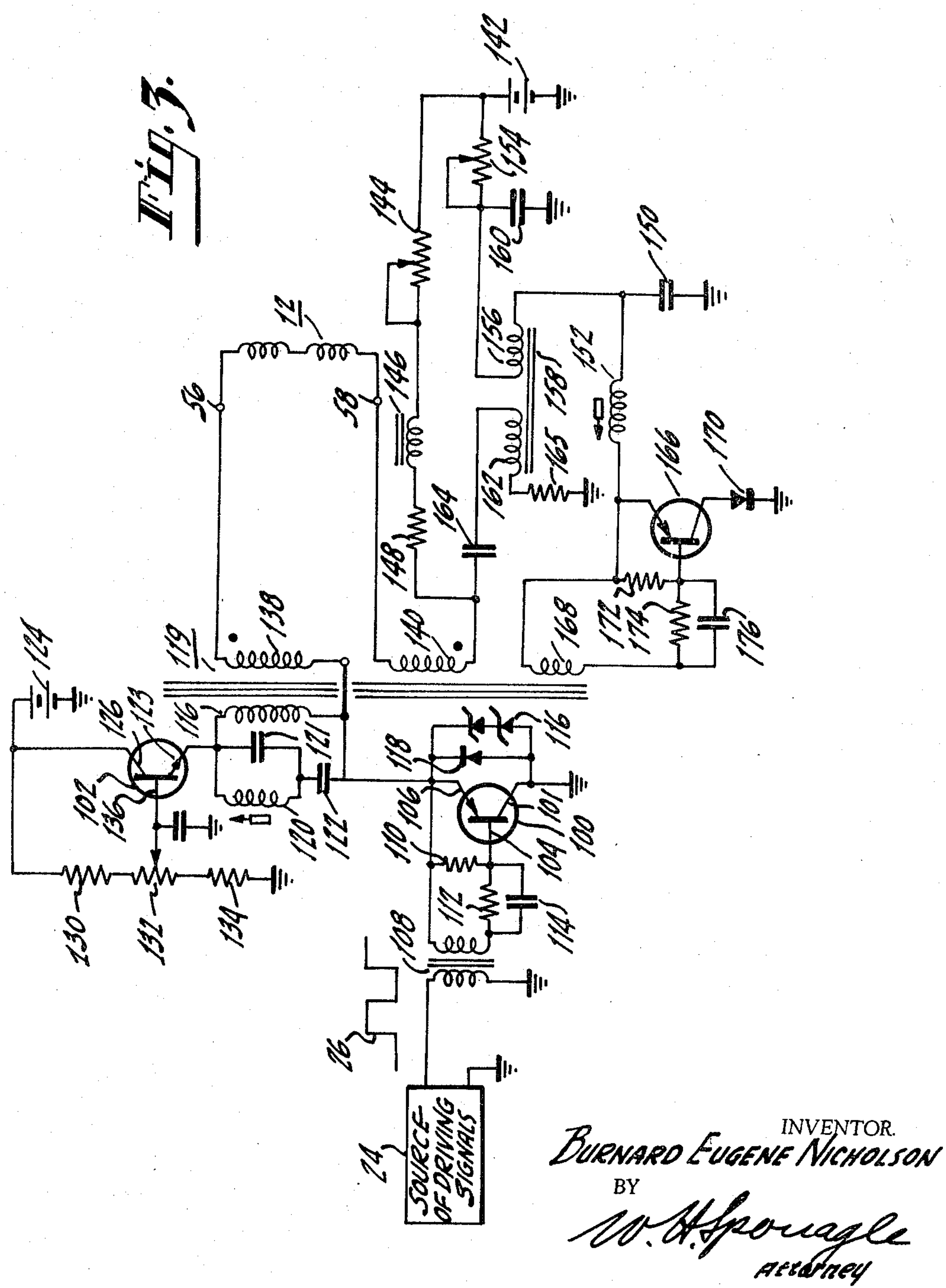
FIGURE 3 is a schematic diagram of an electron beam deflection circuit employing another embodiment of the present invention.

An alternative arrangement of the linearity correction circuit is illustrated in FIGURE 3. The arrangement of FIGURE 3 differs from FIGURE 1 in the output amplifier stages as well as in the secondary stage of the output transformer. A relatively more efficient deflection circuit is provided by arranging an output amplifier transistor 100 in the common emitter, grounded collector configuration shown. It is advantageous to connect a collector electrode 101 to ground potential for heat-sink purposes. The output amplifier transistor 100 operates as a switch while the configuration of the transistor 102 provides a desired operation voltage level. The signal 26 is coupled between the output transistor base and emitter electrodes 104 and 106 respectively by coupling transformer 108 and by a circuit arrangement comprising resistors 110, 112, and the capacitor 114 which decrease the switching time of the circuit. A diode arangement including transistor protection Zener diodes 116 and a damper diode 118 are connected between the collector and emitter electrodes of the output transistor.

A primary winding 116 of an output transformer 119 is coupled to a deflection current circuit comprising an inductance 120 and the capacitor 121 and to an emitter electrode 123 of transistor 102. The inductance 120 and capacitance 122 are tuned to a third harmonic of the deflection signal frequency and limit the peak voltages at the output transistor 100. A capacitor 122 tunes the circuit including the transformer and a reflected impedance to a frequency greater than the frequency of the signal 26. Direct current operating potential for the transistors is derived from a source 124 and is applied between a collector electrode 126 of the transistor 102 and a collector electrode 128 of the transistor 100. The resistive divider arrangement comprising resistors 130, 132, and 134 establishes a bias at a base electrode 136 of the transistor 102.

The transformer 119 includes a split secondary winding arrangement having windings 138 and 140 polarized as shown. An electron beam deflection winding 12 is coupled in series with the split secondary windings. The deflection winding is advantageously coupled in the manner shown for reducing ringing at the termination of the retrace interval. An electron beam centering circuit is provided and includes a source of direct current potential 142, an adjustable current control rheostat 144, a choke 146 for presenting a high impedance to alternating signals, and a current limiting resistor 148 for limiting the amplitude of a centering current.

The linearity correction circuit includes a storage capacitor 150, an adjustable inductor 152 for forming a resonant circuit with the capacitor 150 as indicated hereinbefore, and a charging circuit. The charging circuit includes the source of potential 142, a linearity current control rheostat 154, and an inductance 156. A capacitor 160 is provided for bypassing the signal from the potential source 142. In order to both provide a desired peak-to-peak amplitude for a linearity correction signal which is applied to the deflection winding and to utilize a power source 142 having a voltage which may be utilized with other circuits of the apparatus, a correction voltage which is generated across the capacitor 150 is coupled by a transformer 158 to the deflection circuit. The correction signal is applied across a primary winding 156 and a voltage generated across a secondary winding 162 of the transformer is coupled by a direct current blocking capacitor 164 to the output transformer secondary transformer 140. Deflection winding current flows in a resistor 165 which is of relatively low resistive value and a voltage which is generated across the resistor 165 by this deflection current is available for driving deflection circuits of other devices such as vidicon devices in a color television broadcast apparatus.

A circuit for recirculating energy in the capacitor 150 in a same manner as was described with respect to the capacitor 63 of FIGURE 1 includes a switching transistor 166 which is driven by a pulse generated across a winding 168 of the transformer 119. A diode 170 inhibits recirculation of the energy in the capacitor at the termination of one half cycle of oscillation. The arrangement also includes resistor 172 and 174 and a capacitor 176 for decreasing the time required for switching the transistor 166 between collector current cutoff and conduction.

Thus an improved circuit arrangement has been described for providing linearity correction in an electromagnetic deflection circuit by applying a correction signal to the deflection winding. The circuit is particularly advantageous in view of its relative simplicity and effective utilization of electrical energy.

While there has been illustrated, described and pointed out in the annexed claims, certain novel features of the invention, it will be understood that certain variations, omissions, and substitutions in the forms and details of the system illustrated may be made by those skilled in the art without departing from the spirit of the invention and the scope of the claims.

What is claimed is:

1. A deflection circuit arrangement comprising:

an electron beam deflection winding;

circuit means coupled to said winding for causing a cyclical deflection current of sawtooth waveform to flow in said winding; and a linearity correction circuit coupled to said winding for providing a linearity correcting voltage at said winding during a trace interval $T_T$, of a deflection cycle, said correction circuit including a first electrical element having reactance of one sign for cumulatively storing electrical energy and thereby generating a linearity correction voltage, means including a source of direct current operating potential for coupling electrical energy to said first element during a trace interval of the deflection cycle, means for coupling a correction voltage from said first element to said deflection winding; and circuit means including a second electrical element having reactance of opposite sign to the reactance of said first element to resonate with said first element and a switching means arranged to recirculate energy in said first element during a retrace interval, $T_R$, of the deflection cycle.

2. A deflection circuit arrangement comprising:

an electron beam deflection winding;

circuit means including an output transformer having a winding thereof coupled to said deflection winding and arranged for causing a cyclical deflection current of sawtooth waveform to flow in said deflection winding;

a capacitor coupled to said deflection winding;

means for coupling electrical energy to said capacitor in a manner for causing a voltage having a linearity correcting waveshape to appear across said capacitor during a trace interval, $T_T$, of a deflection cycle;

an inductor adapted to resonate with said capacitor at a frequency having a period, $T_{RO}$, which is substantially equal to twice the period $T_R$ of a retrace interval of the deflection cycle; and switching circuit means arranged in a series circuit loop with said capacitor and inductor and adapted for automatically introducing a relatively high impedance in the loop during the trace interval and a relatively low impedance during the retrace interval.

3. A deflection circuit arrangement comprising:

an electron beam deflection winding;

circuit means including an output transformer having a first terminal of a secondary winding thereof coupled to said deflection winding;

said circuit means adapted for generating a first voltage across said secondary winding, said first voltage causing a cyclical current of sawtooth waveform to flow in said deflection winding;

a capacitor, a first inductance, and a source of direct current operating potential intercoupled in series for causing a linearity correcting voltage waveform to be generated across said capacitor;

means coupling said capacitor to a second terminal of said transformer winding in a manner for causing a sum of said first voltage and said capacitor voltage to be applied to said deflection winding;

a second inductance coupled in parallel to said capacitor and adapted to resonate with said capacitor at a frequency having a period, $T_{RO}$, which is substantially equal to twice the period $T_R$ of a retrace interval of said deflection cycle;

a transistor having base, collector and emitter electrodes;

means intercoupling said capacitor, said second inductor and said transistor collector and emitter electrodes in a series circuit loop; and means for applying a cyclical signal to said transistor base electrode for driving said terminal to collector current cutoff during a trace interval, $T_T$, of the deflection cycle and to collector current conduction during a retrace interval, $T_R$.

4. A deflection circuit arrangement comprising:

an electron beam deflection winding;

circuit means including an output transformer having a secondary winding thereof coupled to said deflection winding;

said circuit means adapted for generating a first voltage across said winding, said first voltage causing a cyclical current of sawtooth waveform to flow in said deflection winding;

a capacitor, a first inductance, and a source of direct current operating potential intercoupled in series for causing a linearity correcting voltage waveform to be generated across said capacitor;

a second transformer having primary and secondary windings;

said primary winding comprising said first inductance;

means coupling said secondary winding of said second transformer in series with the secondary winding of said first transformer in a manner for causing a sum of said first voltage and said capacitor voltage to be applied to said deflection winding;

a second inductance coupled in parallel to said capacitor and adapted to resonate with said capacitor at a frequency having a period, $T_{RO}$, which is substantially equal to twice the period, $T_R$, of a retrace interval of the deflection cycle;

a transistor having base, collector and emitter electrodes;

means intercoupling said capacitor, said second inductance and said transistor collector and emitter electrodes in a series circuit loop; and means for applying a cyclical signal to said transistor base electrode for driving said transistor to collector current cutoff during a trace interval $T_T$ of the deflection cycle and to collector current conduction during a retrace interval, $T_R$.

References Cited by the Examiner

UNITED STATES PATENTS 2,954,504 9/1960 Saudinaitis ---------- 315—27

DAVID G. REDINBAUGH, *Primary Examiner.*

T. A. GALLAGHER, *Assistant Examiner.*